Patented Aug. 12, 1952

UNITED STATES PATENT OFFICE 2,606,857

FUMIGATING WITH ETHYLENE BROMIDE AND METHYL BROMIDE

Joseph Carl Dawson, Ferguson, Mo.

No Drawing. Application January 11, 1951, Serial No. 205,613

5 Claims. (Cl. 167—39)

This invention relates to methods of fumigating and more particularly to methods for space, bulk storage and soil fumigation.

This application is a continuation-in-part of my copending application, Serial No. 87,567, filed April 14, 1949, now abandoned.

Briefly, this invention provides a method of fumigating space, bulk storage or soil by means of a mixture consisting essentially of ethylene dibromide and methyl bromide per se or dissolved in a carrier. The ethylene dibromide-methyl bromide mixture constitutes not less than approximately 50% of the composition.

Among the objects of this invention are the provision of an effective fumigant which is adaptable to all types of fumigation; the provision of a fumigant which is effective in relatively small concentrations; the provision of a fumigant which affords effective results; and the provision of improved methods of fumigation. Other features will be in part apparent and in part pointed out hereinafter.

The invention accordingly comprises the ingredients and combinations of ingredients, the proportions thereof, steps and sequence of steps, and features of composition and manipulation, which will be exemplified in the methods hereinafter described, and the scope of the application of which will be indicated in the following claims.

The need for fumigation in space, bulk storage, and soil is well known and recognized. Many compounds have been suggested and tried in connection with the fumigation of such space, bulk storage and soil, and these are, in general, subject to criticism and objection for one or more of a large number of reasons. It is an important object of this invention to provide a fumigating method capable of overcoming the disadvantages and objections of previous fumigating compounds and methods.

An important problem in fumigating is the factor of danger to the operator which is often increased by reason of the lack of odor of certain fumigants. Furthermore, where fumigants are made up of several components it is often necessary to provide more than one compound in a protective gas mask canister whereby the effectiveness of the mask is reduced considerably.

Other objections to previous fumigants arise from their extreme volatility which brings about an explosion hazard in closed storage spaces and also augments the tendency of the fumigant to escape from the storage region. Furthermore, critical proportions between the various components of various fumigants render them difficult to adaption to special or particular fumigation problems where there are optimum vapor pressure values inherent to the solution of the problem.

It has been found that a fumigant comprising a mixture of ethylene dibromide (also often called ethylene bromide) and methyl bromide possesses the desirable properties enumerated above and is very effective in the various uses of fumigants. The mixture has a readily detectable and distinctive odor which serves to warn the operator of danger promptly upon exposure. Furthermore, protection against both compounds may be had with a single-component gas mask canister.

While it is true that both ethylene dibromide and methyl bromide have been used separately as fumigants, they have not been used in combination. Furthermore, the synergistic effect of combining the two compounds has been clearly demonstrated in tests which establish that the effectiveness of mixtures of the compounds is far in excess of what might be predicted based upon observations made while using the components alone and separately.

Table I below shows the results of tests made to inveigate the synergistic action obtained by combining ethylene dibromide and methyl bromide to produce an improved fumigant.

TABLE I

| Percent $CH_2Br.CH_2Br$ | Percent $CH_3Br$ | Dosage Mg. per liter | | Mortality [1] | |
|---|---|---|---|---|---|
| | | $CH_2Br.CH_2Br$ | $CH_3Br$ | After 24 Hours | After 48 Hours |
| 0 | 100.0 | 0 | 8.48 | 68.0 | 72.0 |
| 100.0 | 0 | 2.25 | 0 | 2.6 | 9.2 |
| 20.9 | 79.1 | 2.25 | 8.48 | 99.3 | 100.0 |
| 0 | 100.0 | 0 | 6.75 | 25.9 | 33.7 |
| 100.0 | 0 | 4.50 | 0 | 8.6 | 22.5 |
| 40.0 | 60.0 | 4.50 | 6.75 | 97.2 | 100.0 |
| 0 | 100.0 | 0 | 5.62 | 14.8 | 23.3 |
| 100.0 | 0 | 5.62 | 0 | 20.3 | 47.9 |
| 50.0 | 50.0 | 5.62 | 5.62 | 91.9 | 100.0 |
| 0 | 100.0 | 0 | 9.00 | 88.6 | 92.6 |
| 100.0 | 0 | 9.00 | 0 | 27.3 | 57.3 |
| 25 | 75.0 | 2.25 | 6.75 | 92.0 | 100.0 |
| 0 | 100.0 | 0 | 7.87 | 55.9 | 72.1 |
| 100.0 | 0 | 7.87 | 0 | 24.8 | 65.1 |
| 28.5 | 71.5 | 2.25 | 5.62 | 88.0 | 100.0 |

[1] Each value represents the mean of 5 replicates.

The data in Table I were obtained by standard laboratory procedures wherein the test insects were exposed to the vapor of the fumigant in a tightly closed chamber for a period of five hours. At the end of the five-hour exposure period the insects were transferred to clean containers and the percentage mortality determined at 24 and 48 hours after the beginning of the exposure period. The confused flour beetle, *Tribolium confusum*, was used as a test insect for these investigations.

It wil be noted from Table I that the fumigants of this invention proved vastly superior to fumigants consisting of either ethylene dibromide or methyl bromide alone. In every case, the fumigants made up of the combination of ethylene dibromide and methyl bromide produced a 100% kill in 48 hours. In contrast, neither the ethylene dibromide nor the methyl bromide ever effected a 100% kill in a 48 hour period. The synergistic action of the combination is clearly established. In every case the effect of combining concentrations of the two components is to bring about a much greater mortality than would be supposed or predicted from values obtained when using either component alone and far in exces of the figure obtained by merely adding the mortality figures for the single components together. That this effect cannot be attributed merely to the presence of increased concentrations of fumigants whenever the mixture is used is clearly shown by the last two examples where the concentration of fumigant was held constant in all cases, and a synergistic effect is still obtained. Results such as illustrated by the examples have been repeatedly and consistently obtained.

The following examples illustrate the invention.

Example 1

A flour mill was fumigated. The mill consisted of a packing room and several rooms adjoining and adjacent thereto of wood frame construction, extremely open and likely to leak fumigant rapidly. Test box insects were used and methyl bromide was used as the fumigant. Part of the gas was shot into the area to be fumigated and then after a reasonable time interval had passed, the area was then checked with a halide leak detector and found to contain only a trace of gas and the insects apparently were not affected. Additional gas was released and more time allowed to elapse whereupon a similar reexamination showed a similar condition. Gas was released then for a second time and similarly for a third time. The total amount of gas used amounted to 470 pounds which was approximately 2.21 pounds per thousand cubic feet. When aeration had been completed, the insect kill in the test boxes and elsewhere was about 50%.

Several months later the same flour mill was refumigated but a composition of methyl bromide and ethylene dibromide was employed. Sixty-five pounds of ethylene dibromide were poured on bags and on walls and 330 pounds of methyl bromide were released into the area. After about twelve hours the area was reentered, the leak detector showed a reasonable concentration of halide fumigant remaining and the insects were either dead or very nearly so. The concentration of the combined methyl bromide and ethylene dibromide was approximately 1.86 pounds per thousand cubic feet. After aeration, 100% kill of insects was recorded.

Example 2

A flour warehouse of open structure similar to that of Example 1 was fumigated. Eighty percent methyl bromide and 20% ethylene dibromide by weight were mixed together. The mixed vapor was then released into the area. Again a 100% kill of the insects was obtained.

Example 3

A mill and warehouse were fumigated. The warehouse has one floor which is constructed of wood and covered with corrugated metal. This building has a content of 141,751 cubic feet. The mill is constructed of brick and consists of a basement, cupola and three floors. The content is 170,700 cubic feet. The packing department is a separate building consisting of two floors and a basement with a content of 37,060 cubic feet. The mill proper including the feed department and packing department has a combined content of 207,773 cubic feet.

The warehouse was fumigated with a mixture of 80% methyl bromide and 20% ethylene dibromide by weight. Four fifty-pound cylinders were used at the rate of two pounds per thousand cubic feet. The outer temperature at the time of fumigation was 51° F. and the inside temperature was 66° F. Cages containing live *Sitophilus granarius* (L.) were placed in locations where obtaining a kill would be most difficult. Although the warehouse is loosely constructed, a substantially complete kill was obtained.

Example 4

Two circular steel grain bins containing 3000 bushels of corn each were fumigated on a clear, rather windy, moderately warm day. Fifteen pounds per bin of a mixture of 80% methyl bromide and 20% ethylene dibromide were employed. Before the application of any gas, each of the bins was probed and samples of corn were removed to be tested for temperature and moisture.

Small cotton bags containing live immature stages of *Sitotroga cerealella* Oliv. as test insects were placed about in each bin in the following manner. Two bags were placed on the left side, right side and back side of each bin. One bag was buried just a few inches below the surface and the other bag approximately two and one-half feet below the surface of the corn. In the center of each bin a probe containing corn with the immature stages and adults of *Sitophilus granarius* (L.) and *Tribolium confusum* was buried. These corn samples in the probes were approximately two feet apart from the bottom of the bin to the surface of the corn inside the bin.

Fumigation was performed by burying a Saran tube approximately ten to fifteen inches below the surface of the corn in one complete circle approximately three feet from the side of the bin. The tube was plugged at one end and small holes were drilled at every three foot interval in the tube portion which was buried. The remaining portion of the tube extended to a cylinder on the outside containing the gas to be used under pressure. The gas was released by opening a valve to expel the desired amount of gas. Test insects were removed ten days later for observation.

The results obtained were as follows:

| Bin Number | Treatment and dosage per 1000 bu.: 5 lb. | Percent Mortality of— | | | | | |
|---|---|---|---|---|---|---|---|
| | | Sitophilus granarius (L.) | | | Tribolium confusum | | |
| | | Btm. | 3 and 6 Ft. | 9, 12 and 15 Ft. | Btm. | 3 and 6 Ft. | 9, 12 and 15 Ft. |
| | | Percent | Percent | Percent | Percent | Percent | Percent |
| 1 | M. Br. 80%  E. D. Br. 20% | 100 | 100 | 100 | 100 | 100 | 100 |
| 2 | M. Br. 80%  E. D. Br. 20% | 100 | 100 | 100 | 100 | 100 | 100 |

Subsequent emergence of immature stages of Sitophilus granarius (L.) and of Sitotroga cerealella Oliv. from infested corn samples buried in the bin was practically zero.

*Example 5*

Example 4 was repeated but in lieu of a mixture of 80% methyl bromide and 20% ethylene dibromide, a mixture of 50% methyl bromide and 50% ethylene dibromide by weight was employed.

The results were as follows:

| Bin Number | Treatment and dosage per 1000 bu.: 5 lb. | Percent Mortality of— | | | | | |
|---|---|---|---|---|---|---|---|
| | | Sitophilus granarius (L.) | | | Tribolium confusum | | |
| | | Btm. | 3 and 6 Ft. | 9, 12 and 15 Ft. | Btm. | 3 and 6 Ft. | 9, 12 and 15 Ft. |
| | | Percent | Percent | Percent | Percent | Percent | Percent |
| 1 | M. Br. 50%  E. D. Br. 50% | 100 | 100 | 100 | 100 | 100 | 100 |
| 2 | M. Br. 50%  E. D. Br. 50% | 100 | 100 | 100 | 100 | 100 | 100 |

Subsequent emergence of immature stages of Sitophilus granarius (L.) and of Sitotroga cerealella Oliv. from infested corn samples buried in the bin was practically zero.

*Example 6*

Example 4 was repeated except that while one bin contained 3000 bushels of corn the second bin contained approximately 2000 bushels, and in lieu of a mixture of 80% methyl bromide and 20% ethylene dibromide, a mixture of 20% methyl bromide and 80% ethylene dibromide by weight was employed.

The results were as follows:

| Bin Number | Treatment and dosage per 1000 bu.: 5 lb. | Percent Mortality of— | | | | | |
|---|---|---|---|---|---|---|---|
| | | Sitophilus granarius (L.) | | | Tribolium confusum | | |
| | | Btm. | 3 and 6 Ft. | 9, 12 and 15 Ft. | Btm. | 3 and 6 Ft. | 9, 12 and 15 Ft. |
| | | Percent | Percent | Percent | Percent | Percent | Percent |
| 1 | M. Br. 20%  E. D. Br. 80% | 100 | 100 | 100 | 100 | 100 | |
| 2 | M. Br. 20%  E. D. Br. 80% | 100 | 100 | | 100 | 100 | |

Subsequent emergence of immature stages of Sitophilus granarius (L.) and Sitotroga cerealella Oliv. from infested corn samples buried in the bin was practically zero.

Had grain fumigant materials now commonly employed been used in carrying out the fumigation described in Examples 4, 5 and 6, the customary amount would have been 55 pounds per thousand bushels.

Where soil fumigation is to be carried out, the mixture of methyl bromide and ethylene dibromide may be dissolved in a suitable carrier such as a low boiling petroleum fraction. In such compositions, however, the mixture of methyl bromide and ethylene dibromide should not constitute substantially less than 50% of the total of the composition. Other customary carriers in which the mixture is soluble may be utilized in lieu of the low boiling petroleum fraction.

An important advantage of the retention of the synergistic effect upon combining ethylene dibromide and methyl bromide in any proportions lies in the fact that this permits the adjusting of the vapor pressure to meet any particular requirements set up by a specific fumigating problem. That such different requirements do exist as between soil fumigation and space fumigation, for example, is well known and recognized in the art.

Although all proportions of the components of the fumigant of this invention containing between 5 and 95% ethylene dibromide are believed to possess desirable synergistic properties, the preferred range of mixture is defined by fumigants containing from about 20% to about 80% ethylene dibromide with the remainder essentially all methyl bromide.

In view of the above, it will be seen that the several objects of the invention are achieved and other advantageous results attained.

As many changes could be made in the above methods without departing from the scope of the invention, it is intended that all matter contained in the above description shall be interpreted as illustrative and not in a limiting sense.

I claim:

1. The method of fumigating which comprises treating insect infested material and space with a vaporized mixture of between approximately 5% and approximately 95% by weight of ethylene dibromide and between approximately 5% and approximately 95% by weight of methyl bromide.

2. The method of fumigating which comprises treating insect infested material and space with a vaporized mixture of between approximately 20% and approximately 80% by weight of ethylene dibromide and between approximately 80% and approximately 20% by weight of methyl bromide.

3. The method of fumigating which comprises treating insect infested material and space with a vaporized mixture of methyl bromide and ethylene dibromide, said mixture comprising between approximately 20% and approximately 80% by weight of ethylene dibromide and the remainder essentially methyl bromide.

4. The method of fumigating which comprises treating insect infested material and space with a vaporized mixture of approximately 20% by weight of ethylene dibromide and approximately 80% by weight of methyl bromide.

5. The method of fumigating which comprises treating insect infested material and space with a vaporized mixture of methyl bromide and ethylene dibromide in essentially equal proportions.

JOSEPH CARL DAWSON.

REFERENCES CITED

The following references are of record in the file of this patent:

UNITED STATES PATENTS

| Number | Name | Date |
|---|---|---|
| 2,147,947 | Johnson | Feb. 21, 1939 |
| 2,324,471 | Allen et al. | July 20, 1943 |
| 2,324,472 | Allen et al. | July 20, 1943 |
| 2,344,105 | Peters | July 20, 1943 |
| 2,362,472 | Dreisbach et al. | Nov. 14, 1944 |
| 2,391,890 | Fletcher et al. | Jan. 1, 1946 |
| 2,425,238 | Fletcher et al. | Aug. 5, 1947 |

FOREIGN PATENTS

| Number | Country | Date |
|---|---|---|
| 219,013 | Switzerland | Mar. 1, 1942 |
| 273,713 | Great Britain | Oct. 6, 1927 |
| 453,084 | Great Britain | Sept. 4, 1936 |
| 571,693 | Germany | Apr. 29, 1930 |

OTHER REFERENCES

Huckel et al. J. Prakt. Chem. volume 142, pages 207 to 217 (1935).